US010679404B2

(12) United States Patent
Neulander

(10) Patent No.: US 10,679,404 B2
(45) Date of Patent: Jun. 9, 2020

(54) SHADOWS FOR INSERTED CONTENT

(71) Applicant: Google LLC, Mountain View, CA (US)

(72) Inventor: Ivan Neulander, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/150,813

(22) Filed: Oct. 3, 2018

(65) Prior Publication Data
US 2019/0102935 A1    Apr. 4, 2019

Related U.S. Application Data

(60) Provisional application No. 62/568,115, filed on Oct. 4, 2017, provisional application No. 62/568,083, filed on Oct. 4, 2017.

(51) Int. Cl.
G06T 15/60 (2006.01)
G06T 17/20 (2006.01)
G06T 7/70 (2017.01)
G06T 13/40 (2011.01)
G02B 27/01 (2006.01)
(Continued)

(52) U.S. Cl.
CPC .......... G06T 15/60 (2013.01); G02B 27/0172 (2013.01); G06T 7/70 (2017.01); G06T 13/40 (2013.01); G06T 15/005 (2013.01); G06T 17/20 (2013.01); G06T 19/006 (2013.01); G02B 2027/0138 (2013.01); G06T 2210/12 (2013.01)

(58) Field of Classification Search
None
See application file for complete search history.

(56) References Cited

U.S. PATENT DOCUMENTS 6,437,782 B1   8/2002   Pieragostini et al.
6,791,563 B2   9/2004   Bragg et al.
(Continued)

FOREIGN PATENT DOCUMENTS

CN    104408775 B    4/2017

OTHER PUBLICATIONS

Knop De Castro, et al., "Realistic Shadows for Mobile Augmented Reality", 14th Symposium on Virtual and Augmented Reality (SVR), 2012, pp. 36-45.
(Continued)

*Primary Examiner* — Vu Nguyen
(74) *Attorney, Agent, or Firm* — Brake Hughes Bellermann LLP

(57) ABSTRACT

Systems and methods for generating shadows for inserted content are provided. The inserted content may include augmented reality content that is inserted into an image of a physical space. An example includes determining a location to insert content within an image. The content may include a polygonal mesh defined in part by a skeleton that has a plurality of joints. Examples may further include selecting a plurality of selected joints form the plurality of joints. Examples may also include generating a shadow polygon based on the content and determining shadow contributions values for the plurality of selected joints for pixels of the shadow polygon. Examples may also include combining the shadow contribution values from the selected joints to generate shadow magnitude values for the pixels, rendering the shadow polygon using the shadow magnitude values, and overlaying the inserted content on the rendered shadow polygon.

13 Claims, 12 Drawing Sheets

(51) Int. Cl.
*G06T 15/00* (2011.01)
*G06T 19/00* (2011.01)

(56) References Cited

U.S. PATENT DOCUMENTS

| | | |
|---|---|---|
| 7,589,725 B2 | 9/2009 | Snyder et al. |
| 9,122,053 B2 | 9/2015 | Geisner et al. |
| 2003/0071822 A1 | 4/2003 | Lake et al. |
| 2003/0216175 A1 | 11/2003 | Osako et al. |
| 2003/0234792 A1 | 12/2003 | Junkins et al. |
| 2004/0186631 A1 | 9/2004 | Ohta |
| 2011/0234631 A1 | 9/2011 | Kim et al. |

OTHER PUBLICATIONS

Spanlang, et al., "A virtual whole body system", CHI Whole Body Interaction Workshop, 2010, 4 pages.
Williams, "Casting Curved Shadows on Curved Surfaces", SIGGRAPH '78 Proceedings of the 5th annual conference on Computer graphics and interactive techniques, Aug. 23-25, 1978, pp. 270-274.
International Search Report and Written Opinion for International Application No. PCT/US2018/054356, dated Feb. 5, 2019, 18 pages.
International Search Report and Written Opinion for International Application No. PCT/US2018/054360, dated Jan. 30, 2019, 17 pages.
Kakuta, et al., "Real-time Soft Shadows in Mixed Reality using Shadowing Planes", Proceedings of the IAPR Conference on Machine Vision Applications, May 16-18, 2007, pp. 195-198, XP002787777.
Matzka, "Shadow Algorithms—Computer Science Seminar", Institute of Computer-Graphics, Jun. 13, 2001, retrieved on Jan. 15, 2019 from: https://www.cg.tuwien.ac.at/courses/Seminar/SS2001/shadow/shadow.pdf, 13 pages, XP002787986.

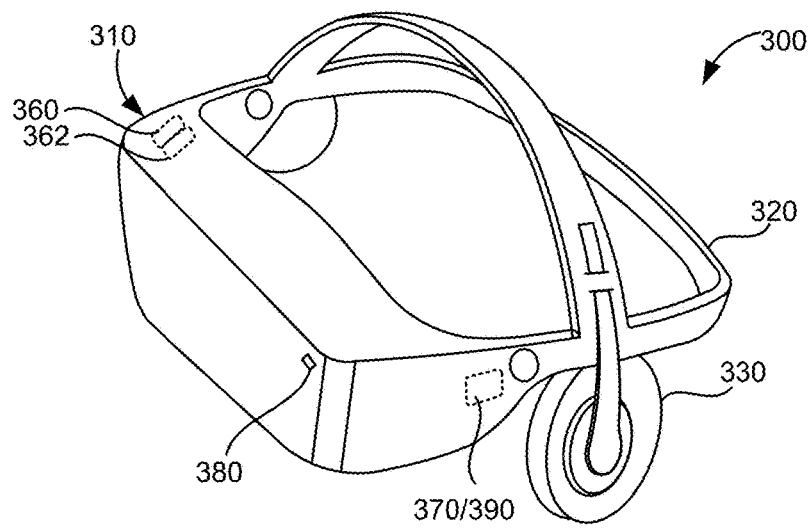
FIG. 3A
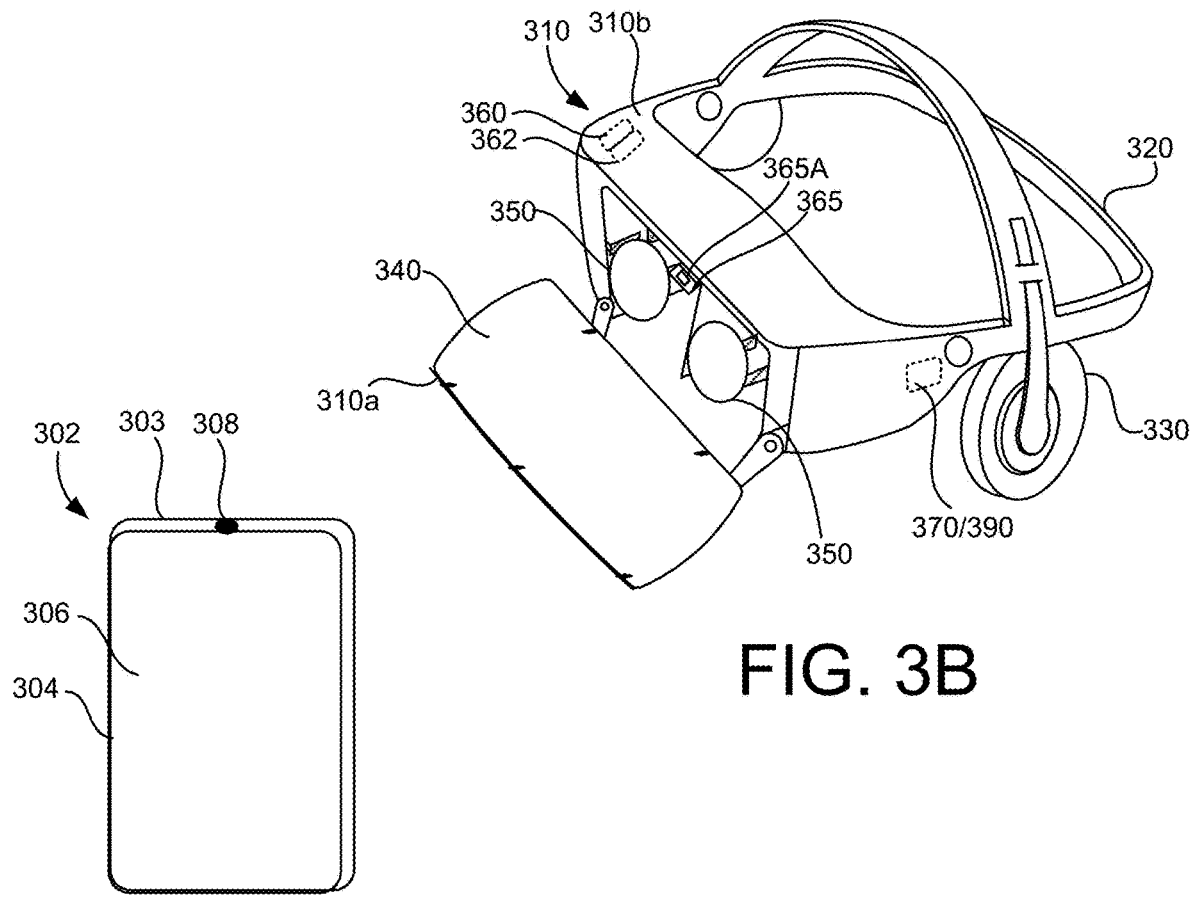
FIG. 3C
FIG. 3B

SHADOWS FOR INSERTED CONTENT

CROSS-REFERENCE TO RELATED APPLICATIONS

This application claims priority to U.S. Application No. 62/568,083, filed on Oct. 4, 2017 and claims priority to U.S. Application No. 62/568,115, filed on Oct. 4, 2017, the disclosures of which are incorporated herein by reference in their entireties.

This application is related to the U.S. application Ser. No. 16/150,794, entitled, "Shadows for Inserted Content", and filed on Oct. 3, 2018, which is incorporated herein by reference in its entirety.

BACKGROUND

Content may be inserted into an image or a user's field of view. For example, an augmented reality (AR) system may generate an immersive augmented environment for a user by inserting content. The immersive augmented environment can be generated by superimposing computer-generated content on a user's field of view of the real world. For example, the computer-generated content can include labels, textual information, images, sprites, and three-dimensional entities. These images may be displayed at a position in the user's field of view so as to appear to overlay an object in the real world. Similarly, the computer-generated content may be overlaid on a displayed image. The inserted content may generate shadows that overlay the displayed image. Existing technology for generating shadows may be inadequate for use in real-time AR applications.

SUMMARY

This disclosure describes systems and methods for generating shadows for inserted content. For example, the inserted content may include augmented reality content that is inserted into an image of a physical space.

One aspect is a method comprising: determining a location to insert content within an image, the content including a polygonal mesh defined in part by a skeleton that has a plurality of joints; selecting a plurality of selected joints form the plurality of joints; generating a shadow polygon; determining shadow contributions values for the plurality of selected joints for pixels of the shadow polygon (e.g., a shadow contribution value for each of the plurality of selected joints); combining the shadow contribution values from the selected joints to generate shadow magnitude values for the pixels; rendering the shadow polygon using the shadow magnitude values; and overlaying the inserted content on the rendered shadow polygon.

Another aspect is a non-transitory computer-readable storage medium comprising instructions stored thereon that, when executed by at least one processor, are configured to cause a computing system to at least: capture an image with a camera assembly; identify a surface plane within the image; determine a location to insert content, the content including a polygonal mesh defined in part by a skeleton that has a plurality of joints; select a plurality of selected joints form the plurality of joints; assign fade-out values to the plurality of selected joints; generate a shadow polygon based on the content; determine shadow contributions values for the plurality of selected joints for pixels of the shadow polygon; combine the shadow contribution values from the selected joints to generate shadow magnitude values for the pixels; normalize the shadow magnitude values to generate normalized shadow magnitude values; apply a radial falloff to the normalized shadow magnitude values to generated adjusted shadow magnitude values; render the shadow polygon using the adjusted shadow magnitude values; and overlay the inserted content on the rendered shadow polygon.

Yet another aspect is a system comprising: at least one processor; and memory storing instructions that, when executed by the at least one processor, cause the system to: identify a surface plane within the image; determine a location to insert content, the content including a skeletal animation model; generate a bounding box on the surface plane for the content based on a plurality of skeletal joints from the skeletal animation model; determine a center of mass location of the content based on projecting the plurality of skeletal joints on the surface plane and averaging positions of the projected skeletal joints; generate a first shadow polygon on the surface plane based on the bounding box and the center of mass location, the first shadow polygon having an oval shape; render the first shadow polygon based on applying a radial falloff function to the center of mass location to generate a rendered first shadow polygon; select a plurality of selected skeletal joints form the plurality of skeletal joints; generate a second shadow polygon based on the content; determine shadow contributions values for the plurality of selected skeletal joints for pixels of the second shadow polygon; combine the shadow contribution values from the selected skeletal joints to generate shadow magnitude values for the pixels of the second shadow polygon; render the second shadow polygon using the shadow magnitude values to generate a rendered second shadow polygon; combine the rendered first shadow polygon and the rendered second shadow polygon to generate a combined shadow polygon; and overlay the inserted content on the combined shadow polygon.

Another aspect is a method comprising: determining a location to insert content within an image, the content including a polygonal mesh defined in part by a skeleton that has a plurality of joints; generating a bounding box for the content based on at least some of the plurality of joints; determining a center of mass location of the content based on at least some of the plurality of joints; generating a first shadow polygon based on the bounding box and the center of mass location; generating first shadow magnitude values for pixels of the first shadow polygon based on the center of mass location; selecting a plurality of selected joints form the plurality of joints; generating a second shadow polygon based on the content; determining shadow contributions values for the plurality of selected joints for pixels of the second shadow polygon; combining the shadow contribution values from the selected joints to generate second shadow magnitude values for the pixels of the second shadow polygon; combining the first shadow magnitude values from the first shadow polygon and the second shadow magnitude values from the second shadow polygon to generate a combined shadow magnitude values; and rendering a combined shadow polygon using the combined shadow magnitude values.

The details of one or more implementations are set forth in the accompanying drawings and the description below. Other features will be apparent from the description and drawings, and from the claims.

BRIEF DESCRIPTION OF THE DRAWINGS

FIGS. 3A, 3B, and 3C are diagrams depicting an example head-mounted display device and controller, in accordance with implementations as described herein.

DETAILED DESCRIPTION

Figure 1:
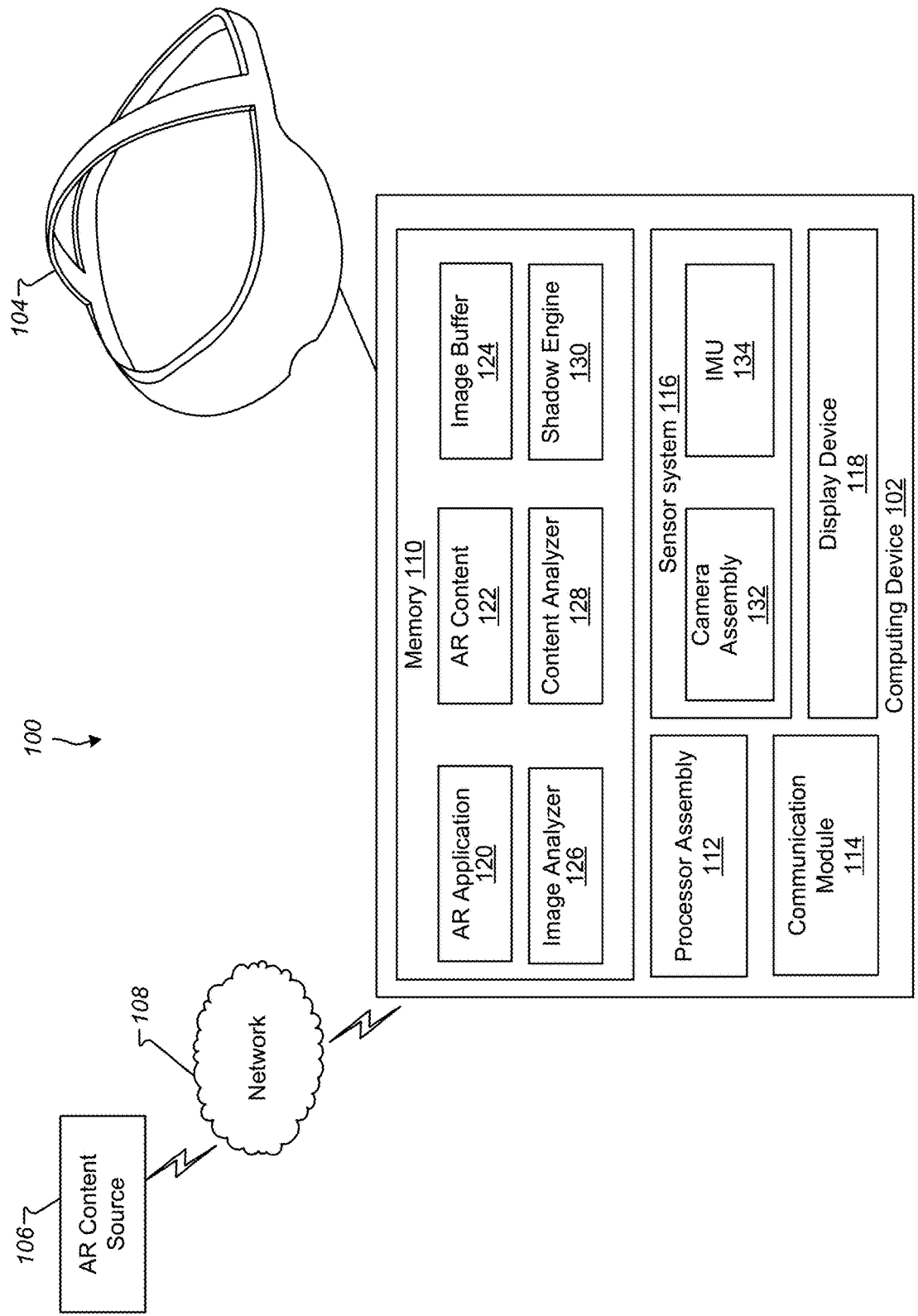
FIG. 1 is a block diagram illustrating a system according to an example implementation.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

Augmented reality (AR) systems include systems that insert computer-generated content into a user's perception of the physical space surrounding the user. The computer-generated content may include labels, textual information, images, sprites, and three-dimensional entities. In some implementations, the content is inserted for entertainment, educational, or informational purposes.

An example AR system is a portable electronic device, such as a smartphone, that includes a camera and a display device. The portable electronic device may capture images using the camera and show AR images on the display device that include computer-generated content overlaid upon the images captured by the camera.

Another example AR system includes a head-mounted display (HMD) that is worn by a user. The HMD includes a display device that is positioned in front of a user's eyes. For example, the HMD may occlude the user's entire field of view so that the user can only see the content displayed by the display device. In some examples, the display device is configured to display two different images, one that is viewable by each of the user's eyes. For example, at least some of the content in one of the images may be slightly offset relative to the same content in the other image so as to generate the perception of a three-dimensional scene due to parallax. In some implementations, the HMD includes a chamber in which a portable electronic device, such as a smartphone, may be placed so as to permit viewing of the display device of the portable electronic device through the HMD.

Another example AR system includes a HMD that permits the user to see the physical space while the HMD is being worn. The HMD may include a micro-display device that displays computer-generated content that is overlaid on the user's field of view. For example, the HMD may include an at least partially transparent visor that includes a combiner that permits light from the physical space to reach the user's eye while also reflecting images displayed by the micro-display device toward the user's eye.

When computer-generated content is inserted into an image, shadows may be generated around or below the content so that the content appears more realistic. For example, a three-dimensional model may be rendered using soft shadows that appear to have been generated by a large-area overhead light source. These soft shadows may be preferable to hard shadows that may be generated point/directional lights because information about the location of point/directional lights may not be available for the physical space.

AR systems may need to refresh images displayed to a user in real time at a high rate, such as 24 frames per second (FPS), 30 FPS, 60 FPS, or another rate. Traditional techniques for generating shadows may require determining or estimating lighting in the physical space. But determining or estimating lighting in a scene from an image may require so many computations (or processor cycles) that it cannot be performed in real-time on an AR system at an acceptable frame rate. Some traditional techniques require prior information about the lighting in an environment, which is may not be available for many of the environments in which an AR system is used. The techniques described further herein allow for generating shadows for inserted content in a realistic manner without requiring prior knowledge of the environmental lighting while using fewer processor cycles than traditional techniques. Additionally, due to the reduced number of processing cycles required by the techniques described herein, these techniques may allow for inserting content into a captured image/video in a realistic manner while using less power than traditional techniques would require. This reduction in power required to estimate lighting and provide shadows for inserted content may be particularly important in AR systems that include battery-operated mobile devices.

An example AR system captures images of the physical space surrounding a user. The system may then identify a surface plane, such as the ground or a floor, in the image and determine a location to insert content. For example, the system may receive a user input indicating a location on the screen for the content. The content may be placed at the location indicated by the user or at a location on the identified surface plane that is below the location indicated by the user. The content may, for example, include a three-dimensional model that is animated using a skeletal animation model. A skeletal animation model may include a mesh and a set of connected skeletal joints (which may be referred to as a skeleton or a rig) that is used to animate and position the mesh. The skeletal joints may be represented as three-dimensional coordinates. In some implementations, the three-dimensional coordinates are defined with respect to a common origin of the skeletal animation model. The skeletal animation model may also store connection data that define segments that connect the joints. These segments may be analogous to bones of skeleton. The segments connecting the joints may move or rotate about at least some of the joints. These movements may result in corresponding changes in the outer surface mesh of the skeletal animation model. As the segments move or rotate, connected joints and segments may also move or rotate. In some implementations, the joints (e.g., skeletal joints) can be an approximation of joints of a skeletal animation model. In some implementations, one or more joints can be at, or can include, an intersection of longitudinal members of content (e.g., an object). In some implementations, a skeleton can be, or can be referred to as a frame.

Next, the system may generate a bounding box and a shadow center point (e.g., a shadow middle point) on the surface plane based on the content. For example, the bounding box may be a rectangular shape on the surface planes that circumscribes all of the joints of a skeletal animation model associated with the content (or a projection of the joints onto the plane). The shadow center point may be a center of mass of the joints. For example, the center of mass may be calculated by averaging the positions of the joints (or the positions of the joints after they have been projected onto the surface plane). In some implementations, the center of mass can be an approximate center of mass. The joints may be weighted equally or may be weighted based on other factors such as distance from the surface plane. In some implementations, not all of the joints are used to generate a bounding box and shadow center point. For example, in some implementations, the inserted content may identify a subset of joints that are to be used in generating the bounding box and shadow center point (i.e., a joint whitelist). In some implementations, the inserted content may identify a subset of joints that are to be excluded when generating the bounding box and shadow center point (i.e., a joint blacklist). For example, the inserted content may be associated with a data structure that includes a joint blacklist or joint whitelist. Each of the skeletal joints of the inserted content may include a Boolean value that indicates whether the joint should be used to generate shadows (e.g., in generating the bounding box and shadow center point).

Based on the bounding box and the shadow center point, a shadow polygon may be generated on the surface plane. The shadow polygon may have various shapes. For example, the shadow polygon may have an oval shape that fits within the bounding box and includes a first and second axis that intersect at the shadow center point. Although much of the description is related to an oval shape, the shape can be any type of oblong shape.

During rendering, the shadow polygon may be shaded with a transparency value (e.g., an alpha value) that increases with distance from the shadow center point (i.e., the shadow polygon becomes more transparent and, therefore, less visible further from the shadow center point). In some examples, the transparency value increases non-linearly based on distance from the shadow center point. The shadow polygon can then be placed behind the content to be inserted as a first shadow entity.

Additionally or alternatively, a second shadow entity can be generated for the content to be inserted. The first shadow entity, which is described above, may generate a single shadow that has a radial falloff from the determined location of the shadow center point. This second shadow entity may have a non-uniform shape based on the joints of the skeletal animation model. Some implementations include the first shadow entity, some implementations include the second shadow entity, and some implementations include both the first shadow entity and the second shadow entity.

To generate the second shadow entity, some implementations generate a second shadow polygon on the surface plane below the location of the content to be inserted. For example, the second shadow polygon may be a rectangle having the same shape as a bounding box of the joints of the skeletal animation model (or a selected subset of joints). The second shadow polygon may comprise a polygon with sixteen or another number of sides, such as eight, ten, twelve, fourteen, fifteen, seventeen, or eighteen sides. Other numbers of sides are possible as well. In some implementations, the sides of the polygon approximate an oval that fits in the bounding box.

Next, a selection of the content may be identified. In some implementations, the selection includes all of the content or a portion of the content. For example, the selection of the content may comprise 25% of the joints in the skeletal animation model associated with the content. The 25% may be selected as the lowest 25% of the joints (i.e., the 25% of the joints having the lowest positional value along a vertical dimension) or as the 25% of the joints that are closest to the surface plane. In some implementations, a different threshold value is used to select joints instead of 25%. For example, in some implementations, the threshold may be 10%, 20%, 30%, 33%, 40%, 50%, or another value. The selection may also be based on a number of joints to be selected, such as 10, 20, 50, 100, or another number of joints. In some implementations, the joints in the selection may be assigned a fade-out factor. The fade-out factor is higher for joints that were close to not being selected. For example, if 25% of joints are selected based on distance to the surface plane, the selected joints that are furthest from the surface plane may have the highest fade-out value. The fade-out value may limit some of the joints' contribution to a shadow so as to prevent popping artifacts that may occur as joints move in and out of the selection during sequential frames. The selection of joints may also be based on values stored in a data structure associated with the inserted content. For example, the data structure may identify some joints to exclude from use in generating shadows. In this case, a threshold percentage or number of joints may identified from the non-excluded joints.

The joints may be assigned a radius value, which may be used to calculate a shadow contribution for the joint. In some implementations, all of the selected joints are assigned the same radius value. Alternatively, the joints may have different radius values that correspond to properties of the model (e.g., the joints that are farthest from other joints may have a larger radius than other joints). For example, the joints having larger radius values may contribute more to a generated shadow. In some implementations, the radius values of some joints are set to zero so as to exclude those joints from contributing to shadows.

A shadow strength (also can be referred to as a shadow magnitude) may then be calculated for each pixel of the second shadow polygon. For example, the shadow strength may be calculated during rendering. The pixel value may be calculated by selecting a maximum shadow contribution from each of the joints in the selection. In other implementations, the pixel value is selected by averaging or summing the shadow contributions of the selected joints.

For each joint, the shadow contribution to a particular pixel may be based on multiple factors, such as a distance factor and an angle of elevation factor. For example, the shadow contribution may be determined by combining the distance factor and the angle of elevation factor. In some implementations, the distance factor corresponds to the geometric solid angle of the joint with respect to the pixel (i.e., corresponding to the space subtended by the joint). In some implementations, the solid angle is calculated as a value that is proportional to the arctangent of the quotient of the radius of the joint divided by the distance to the joint. In some implementations, the distance factor approximates the solid angle and is calculated as the quotient of the radius of the joint divided by the sum of the radius of the joint plus the distance to the joint from the pixel's location in the scene. This approximation of the solid angle may require less processor cycles than calculating the solid angle using the arctangent function. In some implementations, the angle of elevation factor is based on the projection of the vector from the pixel to the joint and the normal vector of the second shadow polygon. For example, in some implementations, the angle of elevation factor is calculated using the following formula:

f*dot(N,V)*r/(r+d) where:

N is the surface normal of the surface plane;
V is the unit vector from the pixel to the joint;
r is the radius of the joint;
d is the distance from the pixel to the joint; and
f is the fade-out value for the joint.

Once the shadow strengths are calculated for each pixel, a gamma function may be applied to normalize the shadow strength. For example, the gamma function may remap the shadow strengths to normalized values that accentuate the midtones without having excessively dark regions. Additionally, a smooth radial falloff may be applied to the second shadow polygon to eliminate hard shadow edges at the polygon border. The smooth radial falloff may be applied in a manner similar to that described for the first shadow polygon.

The inserted content and one or more generated shadow entities may then be presented to the user (e.g., overlaid on a captured image of the physical space surrounding the user, projected/displayed on an optical combiner disposed within the user's field of view, etc.). In some implementations, the first and second shadow entities described above are blended together or otherwise combined. For example, polygons corresponding to the first and second shadow entities may be combined during rendering each pixel by selecting and using the lower transparency value from the first or second shadow entity for each pixel or by combining the values in another way. Although many example herein refer to transparency values (or alpha values), other implementations are possible as well. For example, some implementations calculate a shadow strength rather than a transparency value. The shadow strength would be proportional to the opacity of the shadow entities that are described in terms of transparency/alpha values (e.g., the shadow strength would be highest when the transparency of the shadow entity/polygon is lowest, and the shadow strength would be lowest when the transparency of the shadow entity/polygon is highest). In these implementations, rather than overlaying a partially transparent dark colored polygon over the image, the shadow strength is used to alter the image. For example, the value of a pixel may be multiplied by one minus the shadow strength, wherein the shadow strength has a value between zero and one. In this manner, the pixel value gets darker as the shadow strength increases. In some implementations, a pixel value can include a color of a pixel.

Although many examples described herein relate to AR systems inserting visual content into an AR environment, content may be inserted using the techniques described herein in other systems too. For example, the techniques described herein may be used to insert content into an image or video.

FIG. 1 is a block diagram illustrating a system 100 according to an example implementation. The system 100 generates an augmented reality (AR) environment for a user of the system 100. In some implementations, the system 100 includes a computing device 102, a head-mounted display device (HMD) 104, and an AR content source 106. Also shown is a network 108 over which the computing device 102 may communicate with the AR content source 106.

The computing device 102 may include a memory 110, a processor assembly 112, a communication module 114, a sensor system 116, and a display device 118. The memory 110 may include an AR application 120, AR content 122, an image buffer 124, an image analyzer 126, a content analyzer 128, and a shadow engine 130. The computing device 102 may also include various user input components (not shown) such as a controller that communicates with the computing device 102 using a wireless communications protocol. In some implementations, the computing device 102 is a mobile device (e.g., a smart phone) which may be configured to provide or output AR content to a user via the HMD 104. For example, the computing device 102 and the HMD 104 may communicate via a wired connection (e.g., a Universal Serial Bus (USB) cable) or via a wireless communication protocol (e.g., any WiFi protocol, any BlueTooth protocol, Zigbee, etc.). In some implementations, the computing device 102 is a component of the HMD 104 and may be contained within a housing of the HMD 104.

The memory 110 can include one or more non-transitory computer-readable storage media. The memory 110 may store instructions and data that are usable to generate an AR environment for a user.

The processor assembly 112 includes one or more devices that are capable of executing instructions, such as instructions stored by the memory 110, to perform various tasks associated with generating an AR environment. For example, the processor assembly 112 may include a central processing unit (CPU) and/or a graphics processor unit (GPU). For example, if a GPU is present, some image/video rendering tasks, such as generating shadows or shading polygons representing shadows, may be offloaded from the CPU to the GPU.

The communication module 114 includes one or more devices for communicating with other computing devices, such as the AR content source 106. The communication module 114 may communicate via wireless or wired networks, such as the network 108.

The sensor system 116 may include various sensors, such as a camera assembly 132. Implementations of the sensor system 116 may also include other sensors, including, for example, an inertial motion unit (IMU) 134, a light sensor, an audio sensor, an image sensor, a distance and/or proximity sensor, a contact sensor such as a capacitive sensor, a timer, and/or other sensors and/or different combination(s) of sensors.

The IMU 134 detects motion, movement, and/or acceleration of the computing device 102 and/or the HMD 104. The IMU 134 may include various different types of sensors such as, for example, an accelerometer, a gyroscope, a magnetometer, and other such sensors. A position and orientation of the HMD 104 may be detected and tracked based on data provided by the sensors included in the IMU 134. The detected position and orientation of the HMD 104 may allow the system to detect and track the user's gaze direction and head movement.

In some implementations, the AR application may use the sensor system 116 to determine a location and orientation of a user within a physical space and/or to recognize features or objects within the physical space.

The camera assembly 132 captures images and/or videos of the physical space around the computing device 102. The camera assembly 132 may include one or more cameras. The camera assembly 132 may also include an infrared camera.

The AR application 120 may present or provide the AR content to a user via the HMD and/or one or more output devices of the computing device 102 such as the display device 118, speakers, and/or other output devices. In some implementations, the AR application 120 includes instructions stored in the memory 110 that, when executed by the processor assembly 112, cause the processor assembly 112 to perform the operations described herein. For example, the AR application 120 may generate and present an AR environment to the user based on, for example, AR content, such as the AR content 122 and/or AR content received from the AR content source 106. The AR content 122 may include content such as images or videos that may be displayed on a portion of the user's field of view in the HMD 104. The AR environment may also include at least a portion of the physical (real-world) environment and physical (real-world) entities. For example, shadows may be generated so that the content better fits the physical space in which the user is located. The content may include objects that overlay various portions of the physical space. The content may be rendered as flat images or as three-dimensional (3D) objects. The 3D objects may include one or more objects represented as polygonal meshes. The polygonal meshes may be associated with various surface textures, such as colors and images.

The AR application 120 may use the image buffer 124, image analyzer 126, content analyzer 128, and shadow engine 130 to generate images for display via the HMD 104 based on the AR content 122. For example, one or more images captured by the camera assembly 132 may be stored in the image buffer 124. In some implementations, the image buffer 124 is a region of the memory 110 that is configured to store one or more images. In some implementations, the computing device 102 stores images captured by the camera assembly 132 as a texture within the image buffer 124. Alternatively or additionally, the image buffer may also include a memory location that is integral with the processor assembly 112, such as dedicated random access memory (RAM) on a GPU.

The image analyzer 126 may determine various properties of the image, such as the location of a surface plane upon which the content may be positioned. In some implementations, the surface plane is a substantially horizontal plane that corresponds to the ground, a floor, or another surface upon which objects, such as the content to be inserted, could be placed.

The AR application 120 may determine a location to insert content. For example, the AR application may prompt a user to identify a location for inserting the content and may then receive a user input indicating a location on the screen for the content. The AR application may determine the location of the inserted content based on that user input. For example, the location for the content to be inserted may be the location indicated by the user. In some implementations, the location is determined by mapping the location indicated by the user to a plane corresponding to a surface such as a floor or the ground in the image (e.g., by finding a location on a plane identified by the image analyzer 126 that is below the location indicated by the user). The location may also be determined based on a location that was determined for the content in a previous image captured by the camera assembly (e.g., the AR application may cause the content to move across a surface that is identified within the physical space captured in the image).

The content analyzer 128 may then determine various properties of the content to be inserted at the determined location. For example, the content may be associated with a 3D model and skeletal animation model that includes joints. The skeletal animation model may be disposed within the 3D model and may allow for movement of portions of the 3D model around some or all of the joints. As an example, the content analyzer 128 may determine a bounding box and shadow center point on the surface plane based on the location of at least some of the joints of the skeletal animation model. For example, the skeletal joints may be projected onto the surface plane. In at least some embodiments, the joints are projected from an overhead position so as to generate shadows that appear to come from an overhead light source (e.g., by discarding the height component (i.e., the Y component when the surface is parallel to the X-Z plane) of the 3D position of the joints or setting the height component equal to the height of the plane). In some implementations, all of the joints are used to generate the bounding box and identify the shadow center point. In some implementations, a subset of the joints are used to generate the bounding box and identify the shadow center point (e.g., the inserted content may identify joints to use or exclude). In some implementations, the shadow center point may not be at a center of an object.

The bounding box may be a rectangle on the surface that contains all of the projected joints. In at least some implementations, the rectangle is aligned with the axes of the 3D coordinate system (e.g., if the surface is parallel to the X-Z plane, the sides of the rectangle are aligned with either the X or Z axes).

The shadow center point can be determined in various ways. For example, the shadow center point can be the spatial midpoint of the projected joints. The shadow center point can also be calculated as a center of mass of the projected joints (i.e., the average position of the projected joints). In some implementations, the joints may be assigned weights for purposes of calculating the center of mass. For example, the weights can be assigned based on distance from the surface (e.g., the joints that are closer to the surface have a higher weight than those that are further away).

The content analyzer 128 may also select a plurality of the joints to generate a plurality of selected joints. For example, the content analyzer 128 may select a predetermined percentage of the joints based on distance to the surface plane. In some implementations, the predetermined percentage is 25%, however, other predetermined percentages can be used too. Additionally or alternatively, a predetermined quantity of the joints can be selected. In some implementations, all of the joints are selected. A subset of joints may also be selected. In some implementations, a subset of the joints are selected based on a data structure associated with the inserted content. Beneficially, by selecting a subset of joints, the amount of processor cycles used to generate shadows may be reduced. The content analyzer 128 may also assign a fade-out value to the selected joints. For example, the fade-out value of a joint may be proportional to the distance between the joint and the surface plane. The content analyzer may also assign radius values to the selected joints. In some implementations, a same radius value is assigned to each of the selected joints. For example, the radius value may be determined based on the size of the content (e.g., the radius may be a predetermined percentage of the size of the content in one dimension, such as the longest dimension of the content). Additionally, different radius values may be assigned to the selected joints. In these implementations, the radius values may be based on distance from the selected joint to the next closest joint in the skeletal model.

The shadow engine 130 may generate one or more shadows for the content to be inserted. In some implementations, the shadow engine 130 generates a first shadow polygon based on the bounding box and shadow center point determined by the content analyzer 128. The first shadow polygon may have a dark color (e.g., black) and a transparency value that varies based on distance from the shadow center point. In some implementations, the transparency value is determined by applying a non-linear falloff based on distance from the center point. The non-linear falloff may cause the pixels near the center of the polygon to have a low transparency value and the pixels near the edges of the polygon to have a higher transparency value. In at least some implementations, the pixels on the edge of the polygon are completely transparent.

The shadow engine 130 may also generate a second shadow polygon that is shaded based, at least in part, on the selected joints. For example, each pixel of the second shadow polygon may be shaded according to a shadow strength that is determined based on various properties of the pixel with respect to the selected joints. For example, a shadow contribution value may be calculated with respect to a particular pixel of the second shadow polygon and a particular selected joint. The shadow contribution value may be based on a distance and an overhead angle (also known as an elevation angle) of the particular selected joint relative to the particular pixel (i.e., a selected joint that is closer and/or more directly overhead a pixel makes a stronger shadow contribution than a selected joint that is more distance and/or less directly overhead). Additionally, the shadow contribution value may be reduced (or otherwise scaled) based on the fade-out value assigned to the selected joint (i.e., the selected joints with higher fade-out values will have lower shadow contribution values, all other things being equal, than selected joints with lower fade-out values).

The shadow engine 130 may then combine the shadow contributions from the selected joints to generate a shadow strength value for a particular pixel of the second shadow polygon. For example, the shadow contribution values may be combined by selecting a maximum value from the shadow contributions. Alternatively, the shadow contribution values may be combined by summing or averaging at least some of the shadow contributions values.

The shadow engine 130 may then combine the first shadow polygon and the second shadow polygon. The transparency values discussed with respect to the first shadow polygon and the shadow strengths discussed with respect to the second shadow polygon are generally inverses of one another. For example, a transparency value may be subtracted from a maximum transparency value (e.g., 1.0) to generate a shadow strength value and vice versa. In some implementations, a first shadow strength from the first shadow polygon and a second shadow strength from the second shadow polygon are combined by taking the square root of the sum of the square of the first shadow strength and the square of the second shadow strength.

In some implementations, the shadow engine 130 may also use other techniques to generate shadows. For example, the shadow engine 130 may use shadow maps to generate shadows. An example technique for generating shadow maps is described in Williams, Lance. "Casting Curved Shadows on Curved Surfaces." *ACM Siggraph Computer Graphics*, Vol. 12, No. 3, ACM, 1978. The shadows generated by the shadow maps may be combined with one or more of the first shadow polygon and the second shadow polygon.

In some implementations, the shadows generated using shadow maps are combined with one or more of the first shadow polygon and the second shadow polygon by weighting the shadows based on distance to the inserted content. For example, the shadows generated using shadow maps may be weighted more heavily when the inserted content is closer to the camera assembly 132. The first shadow polygon or the second shadow polygon may be given greater weight when the inserted content is further away from the camera assembly 132 (e.g., to substitute for the shadows generated using shadow maps). Additionally, other techniques to generate shadows may be used too and combined (or weighted) in a similar manner. In some implementations, the shadowing techniques described herein can be combined with a shadow map to produce an overall more realistic overall shadow.

In some implementations, the image analyzer 126, content analyzer 128, and shadow engine 130 may include instructions stored in the memory 110 that, when executed by the processor assembly 112, cause the processor assembly 112 to perform operations described herein to generate an image or series images that are displayed to the user (e.g., via the HMD 104).

The AR application 120 may update the AR environment based on input received from the camera assembly 132, the IMU 134, and/or other components of the sensor system 116. For example, the IMU 134 may detect motion, movement, and/or acceleration of the computing device 102 and/or the HMD 104. The IMU 134 may include various different types of sensors such as, for example, an accelerometer, a gyroscope, a magnetometer, and other such sensors. A position and orientation of the HMD 104 may be detected and tracked based on data provided by the sensors included in the IMU 134. The detected position and orientation of the HMD 104 may allow the system to detect and track the user's position and orientation within a physical space. Based on the detected position and orientation, the AR application 120 may update the AR environment to reflect a changed orientation and/or position of the user within the environment.

Although the computing device 102 and the HMD 104 are shown as separate devices in FIG. 1, in some implementations, the computing device 102 may include the HMD 104. In some implementations, the computing device 102 communicates with the HMD 104 via a cable, as shown in FIG. 1. For example, the computing device 102 may transmit video signals and/or audio signals to the HMD 104 for display for the user, and the HMD 104 may transmit motion, position, and/or orientation information to the computing device 102.

The AR content source 106 may generate and output AR content, which may be distributed or sent to one or more computing devices, such as the computing device 102, via the network 108. In an example implementation, the AR content includes three-dimensional scenes and/or images. Additionally, the AR content may include audio/video signals that are streamed or distributed to one or more computing devices. The AR content may also include an AR application that runs on the computing device 102 to generate 3D scenes, audio signals, and/or video signals.

The network 108 may be the Internet, a local area network (LAN), a wireless local area network (WLAN), and/or any other network. A computing device 102, for example, may receive the audio/video signals, which may be provided as part of AR content in an illustrative example implementation, via the network.

Figure 2:
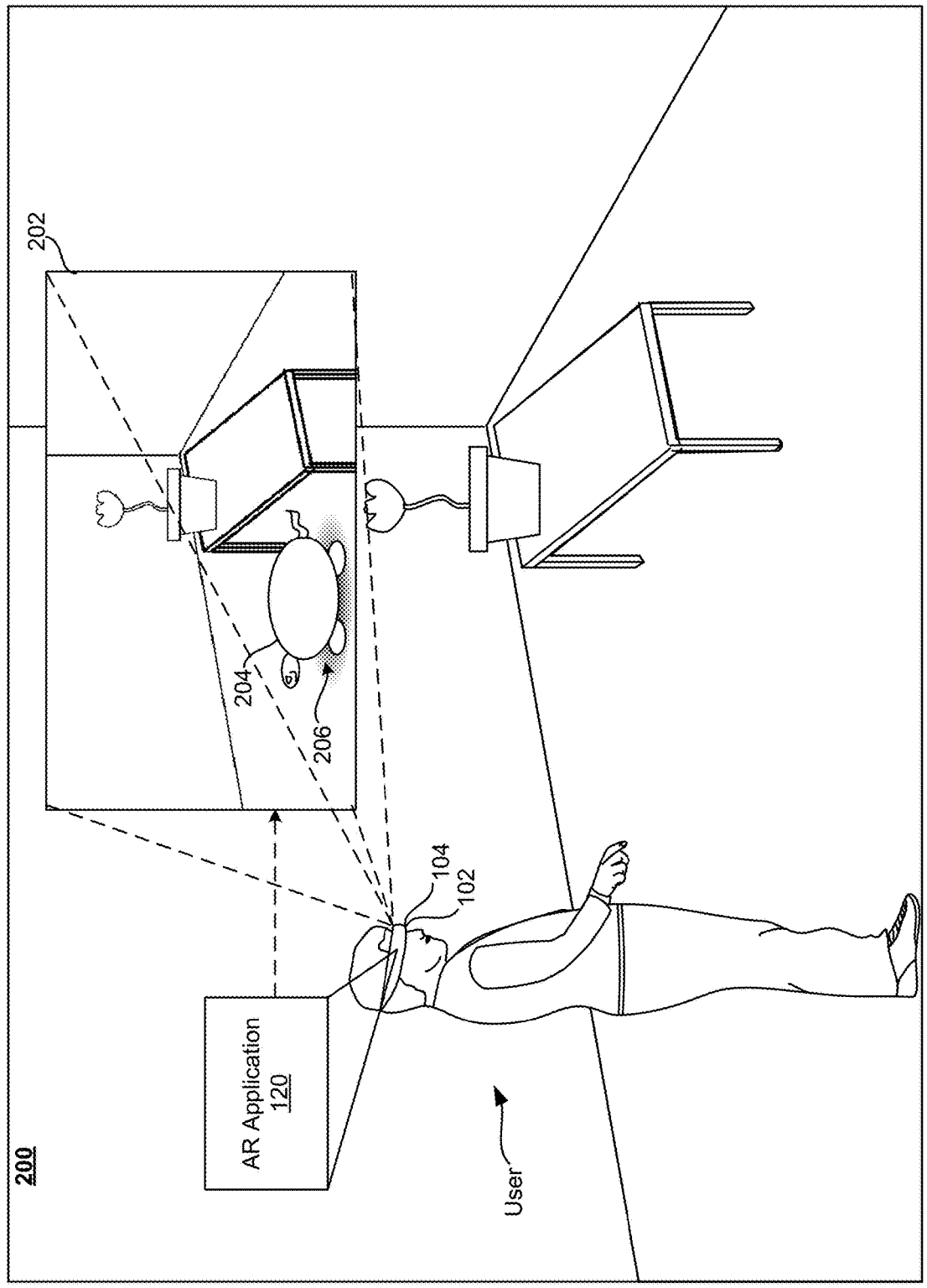
FIG. 2 is a third person view of an example physical space, in which a user is experiencing an AR environment through the example HMD of FIG. 1.

FIG. 2 is a third person view of an example physical space 200, in which a user is experiencing an AR environment 202 through the example HMD 104. The AR environment 202 is generated by the AR application 120 of the computing device 102 and displayed to the user through the HMD 104.

The AR environment 202 includes inserted content 204 that is displayed over an image of the physical space 200. In this example, the content 204 is a turtle that is generating a shadow 206 on the representation of the floor in the AR environment 202. The shadow is generated in accordance with the techniques described herein.

In some implementations, the AR environment 202 is provided to the user as a single image or a pair of stereoscopic images that occupy substantially all of the user's field of view and are displayed to the user via the HMD 104. In other implementations, the AR environment is provided to the user by displaying/projecting the inserted content 204 and the generated shadow 206 on an at least partly transparent combiner that occupies at least a portion of the user's field of view. For example, portions of the HMD 104 may be transparent, and the user may be able to see the physical space 200 through those portions while the HMD 104 is being worn.

FIGS. 3A and 3B are perspective views of an example HMD 300, such as, for example, the HMD 104 worn by the user in FIG. 2, and FIG. 3C illustrates an example handheld electronic device 302 for controlling and/or interacting with the HMD 300.

The handheld electronic device 302 may include a housing 303 in which internal components of the device 302 are received, and a user interface 304 on an outside of the housing 303, accessible to the user. The user interface 304 may include a touch sensitive surface 306 configured to receive user touch inputs. The user interface 304 may also include other components for manipulation by the user such as, for example, actuation buttons, knobs, joysticks and the like. In some implementations, at least a portion of the user interface 304 may be configured as a touchscreen, with that portion of the user interface 304 being configured to display user interface items to the user, and also to receive touch inputs from the user on the touch sensitive surface 306. The handheld electronic device 302 may also include a light source 308 configured to selectively emit light, for example, a beam or ray, through a port in the housing 303, for example, in response to a user input received at the user interface 304.

The HMD 300 may include a housing 310 coupled to a frame 320, with an audio output device 330 including, for example, speakers mounted in headphones, also being coupled to the frame 320. In FIG. 3B, a front portion 310a of the housing 310 is rotated away from a base portion 310b of the housing 310 so that some of the components received in the housing 310 are visible. A display 340 may be mounted on an interior facing side of the front portion 310a of the housing 310. Lenses 350 may be mounted in the housing 310, between the user's eyes and the display 340 when the front portion 310a is in the closed position against the base portion 310b of the housing 310. In some implementations, the HMD 300 may include a sensing system 360 including various sensors and a control system 370 including a processor 390 and various control system devices to facilitate operation of the HMD 300.

In some implementations, the HMD 300 may include a camera 380 to capture still and moving images. The images captured by the camera 380 may be used to help track a physical position of the user and/or the handheld electronic device 302 in the real world, or physical space relative to the augmented environment, and/or may be displayed to the user on the display 340 in a pass through mode, allowing the user to temporarily leave the augmented environment and return to the physical environment without removing the HMD 300 or otherwise changing the configuration of the HMD 300 to move the housing 310 out of the line of sight of the user.

For example, in some implementations, the sensing system 360 may include an inertial measurement unit (IMU) 362 including various different types of sensors such as, for example, an accelerometer, a gyroscope, a magnetometer, and other such sensors. A position and orientation of the HMD 300 may be detected and tracked based on data provided by the sensors included in the IMU 362. The detected position and orientation of the HMD 300 may allow the system to detect and track the user's head gaze direction and movement.

In some implementations, the HMD 300 may include a gaze tracking device 365 to detect and track an eye gaze of the user. The gaze tracking device 365 may include, for example, an image sensor 365A, or multiple image sensors 365A, to capture images of the user's eyes, for example, a particular portion of the user's eyes, such as, for example, the pupil, to detect, and track direction and movement of, the user's gaze. In some implementations, the HMD 300 may be configured so that the detected gaze is processed as a user input to be translated into a corresponding interaction in the immersive virtual experience.

In some implementations, the HMD 300 includes a portable electronic device, such as a smartphone, that is removably disposed within a chamber of the housing 310. For example, the display 340 and the camera 380 may be provided by the portable electronic device. When the chamber is closed (as shown in FIG. 3A), the display 340 is aligned with the lenses 350 so that a user can view at least a portion of the display 340 (provided by the portable electronic device) through each eye. The camera 380 may align with an aperture in the housing 310 so that the portable electronic device of the HMD 300 can capture images while disposed in the housing 310.

Figure 4:
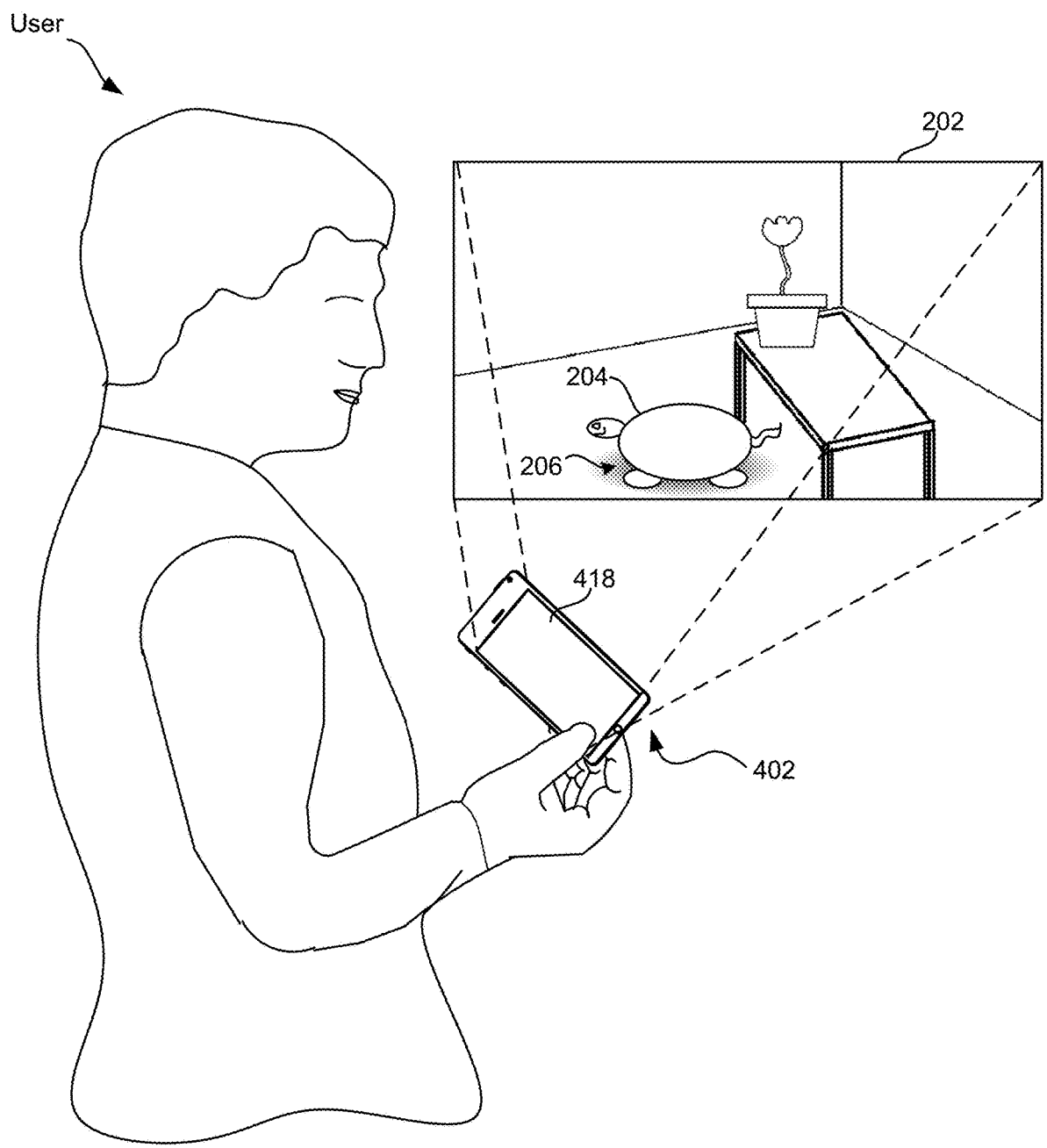
FIG. 4 is a schematic view of a user experiencing the AR environment via an example portable electronic device.

FIG. 4 is a schematic view of a user experiencing the AR environment 202 via an example portable electronic device 402. The portable electronic device 402 is an example of the computing device 102. The portable electronic device 402 may be a smartphone, a tablet, or another type of portable computing device. In this example, the user is experience the AR environment through a display device 418 of the portable electronic device. For example, the display device 418 may include a screen that can show images and/or videos.

Figure 5:
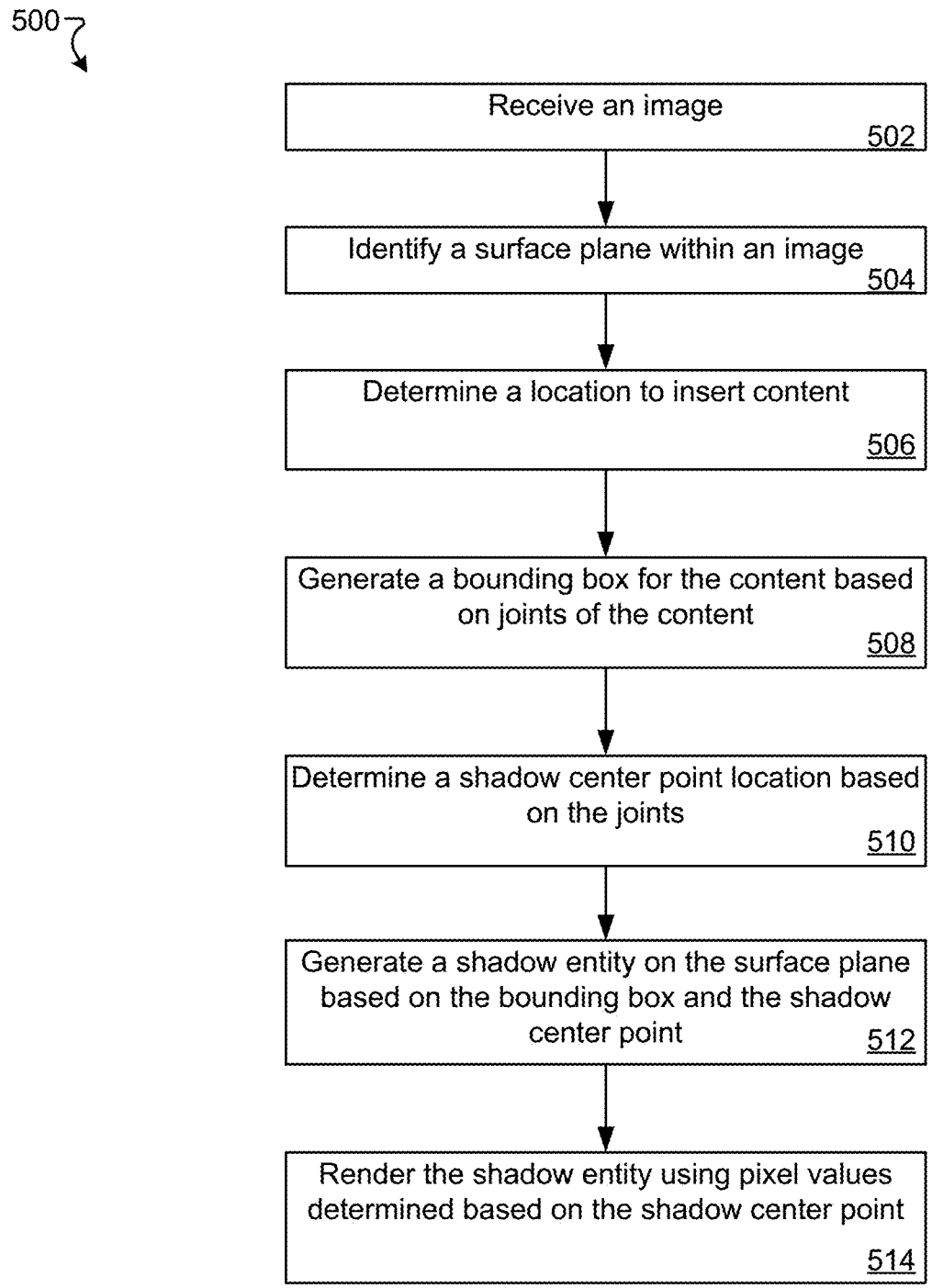
FIG. 5 is a diagram of an example method of generating shadows for inserted content, in accordance with implementations described herein.

FIG. 5 is a diagram of an example method 500 of generating shadows for inserted content, in accordance with implementations described herein. This method 500 may for example be performed by the computing device 102 to provide an AR environment for a user.

At operation 502, an image is received. Receiving the image may comprise capturing the image with a camera assembly, such as the camera assembly 132. Receiving the image may include accessing a previously captured image that is stored in a memory location. An image may also be received from another computing device, such as a server that is accessible via a network.

At operation 504, a surface plane is identified within the image. The surface plane may be identified using various image processing techniques. For example, the surface plane may be identified by identifying a substantially planar region of the image. In some implementations, the surface plane may be generated based on analyzing multiple images (e.g., a sequence of images from a video stream of the physical space). The surface plane may correspond to the ground, a floor, or another surface upon which objects may be placed (e.g., a table, counter, shelf).

At operation 506, a location of content to be inserted is determined. In some implementations, the content to be inserted is AR content. In at least some implementations, the content includes one or more three-dimensional models, such as polygonal meshes. The polygonal mesh may be associated with a skeletal animation model that includes a plurality of skeletal joints that are connected to one another. The skeletal model may allow for movement or rotation around at least some of the joints. These movements may cause corresponding movements or deformations of portions of the polygonal mesh.

The location of the content to be inserted may, for example, be determined by identifying substantially planar surfaces in the received image and positioning the content on an identified surface. The location of the content to be inserted may also be determined at least in part by user input. For example, the user may identify a location within an image to insert content. In some implementations, the content may be placed at a location on a horizontal plane that corresponds to the location identified by the user (e.g., a location below the position identified by the user so the content is positioned on the plane). The location of the content may also be determined based on the location of the content in a previous image (i.e., a previous frame of a video captured by the camera assembly). For example, the content may move around relative to the physical space (e.g., the computer-generated turtle image content shown in FIG. 2 may crawl across the floor).

At operation 508, a bounding box is generated for the content based on the joints. The joints may be projected from above onto the surface plane identified in operation 504. In some implementations, the vertical component of the 3D positions of the joints may be ignored to compute the bounding box. In some implementations, the bounding box is a quadrilateral that bounds (surrounds) the joints. The bounding box may be, for example, a rectangle. In some implementations, a subset of the joints is used to determine the bounding box. For example, the inserted content may be associated with a data structure that identifies some of the joints to use or exclude from using to generate the bounding box.

At operation 510, a shadow center point location is determined based on the joints. For example, shadow center point location is determined based on the positions of the joints projected onto the surface plane. In some implementations, the shadow center point is a spatial midpoint of the joints. In some implementations, the shadow center point is calculated as a center of mass of the points. For example, the joints may be weighted equally and the location of the center point is determined by averaging the position of the joints. In some implementations, the joints are weighted based on distance from the surface plane (e.g., height) and the location of the center point is determined as a weighted average of the positions of the joints. Similar to generating the bounding box (described above at least with respect to operation 508), in some implementations, a subset of the joints may be used to determine the shadow center point location.

At operation 512, a shadow entity is generated on the surface plane based on the bounding box and the shadow center point. For example, the shadow entity may be a polygon that is circumscribed by the bounding box. In at least some implementations, the shadow entity is an oval-shaped polygon that has a first axis and a second axis that intersect at the shadow center point. The oval-shaped polygon may have zero, one, or two axes of symmetry. In some implementations, polygons having other shapes may be used, such as rectangular polygons. Additionally, as one of skill in the art would understand, an oval-shaped polygon is generally represented using multiple straight lines that are arranged to approximate an oval.

At operation 514, the shadow entity is rendered using pixel values determined based on the shadow center point. In some implementations, pixels of the shadow entity are rendered with a dark color, such as black, and have a varying transparency (e.g., alpha value). The transparency value for a pixel may be determined based on the distance between the pixel and the center point. In some implementations, the transparency value is also based on the distance from the pixel value to the edge of the polygon. For example, the transparency value may be determined using a radial fall off function based on the pixel's location represented as a percentage of the distance from the shadow center point to the edge of the polygon. In some implementations, a pixel that is on the edge of the polygon (100%) will be completely transparent and a pixel that is at the shadow center point (0%) will be completely opaque. In some implementations, the radial fall off is linear. In other implementations, the radial fall off is non-linear. For example, for pixels that are less than 50% of the way to the polygon edge, the transparency value may be low such that the shadow entity is substantially opaque; while pixels that are more than 50% of the way to the polygon edge rapidly increase in transparency. In some implementations, a pixel value can include a color of a pixel.

Once the shadow entity is rendered, the inserted content can be added in front of the shadow and then both the shadow entity and the inserted content can be overlaid on the image received at operation 502 to generate an augmented image. The augmented image may then be displayed to the user to provide an augmented environment. Additionally, the rendered shadow entity and the inserted content may be projected onto a transparent combiner surface where they will be shown over a user's field of view of the physical space. Although this example describes adding inserted content in front of the rendered shadow entity, in some implementations the inserted content and the shadow entity are rendered together and only the portions of the shadow entity that would be visible are actually rendered.

Figure 6:
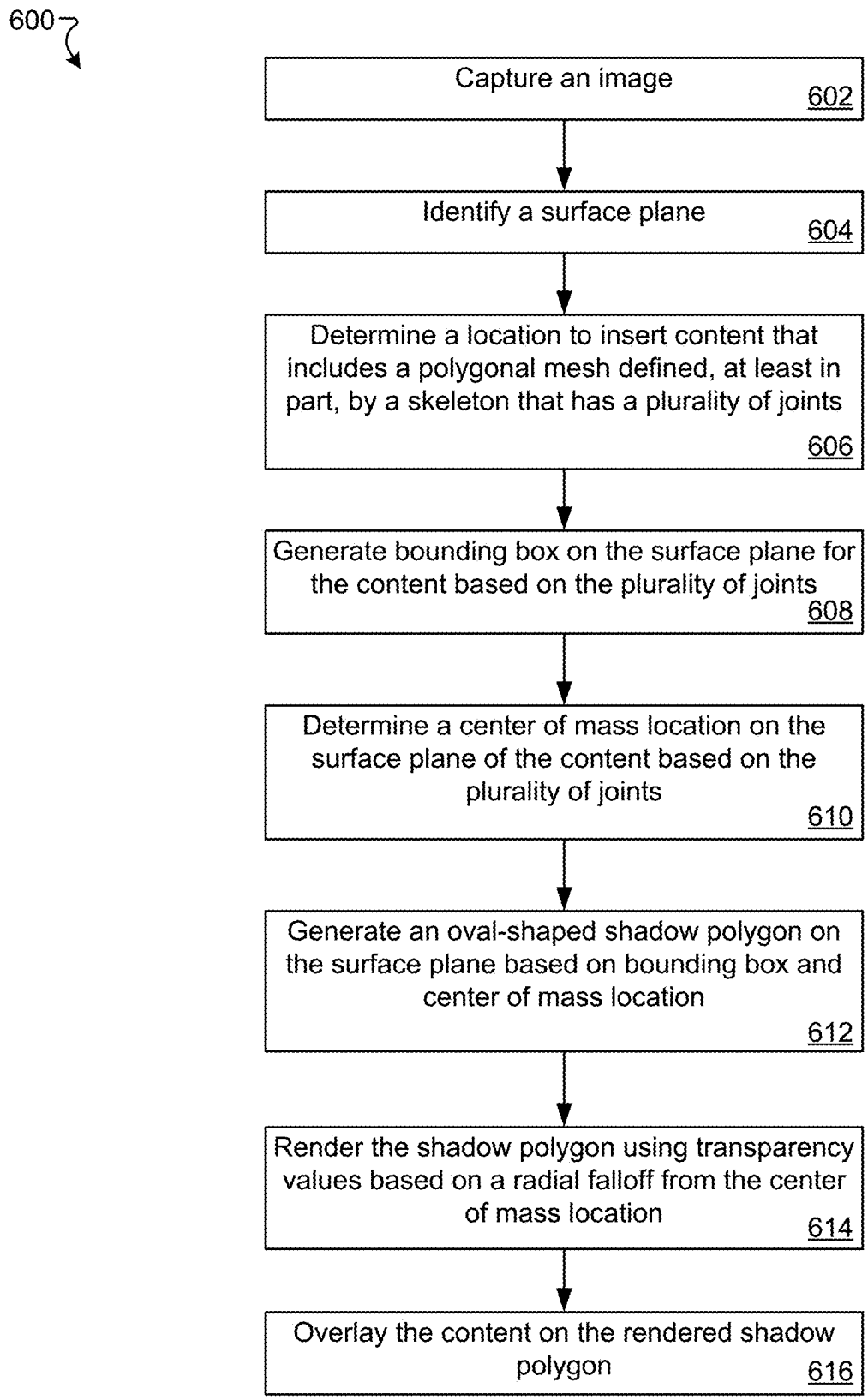
FIG. 6 is a diagram of an example method of generating shadows for inserted content, in accordance with implementations described herein.

FIG. 6 is a diagram of an example method 600 of generating shadows for inserted content, in accordance with implementations described herein. This method 600 may for example be performed by the computing device 102 to provide an AR environment for a user.

Figure 7A:
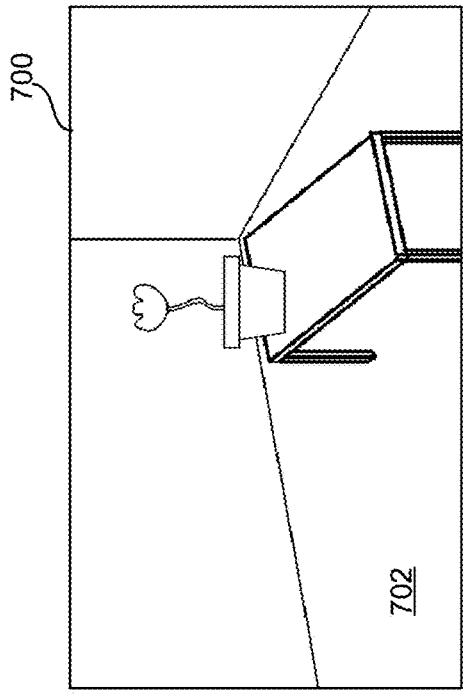
FIGS. 7A-7H are schematic diagrams of steps of generating shadows for inserted content in accordance with implementations as described herein.

At operation 602, an image is captured. For example, the image may be captured by a camera assembly of a computing device, such as the computing device 102. The captured image may be stored as a texture in the image buffer 124. An example image 700 is shown in FIG. 7A.

At operation 604, a surface plane is identified in the image. As described above, the surface plane may correspond to the ground or a floor in the image. An example surface plane 702 that has been identified in the image 700 is shown in FIG. 7A.

Figure 7B:
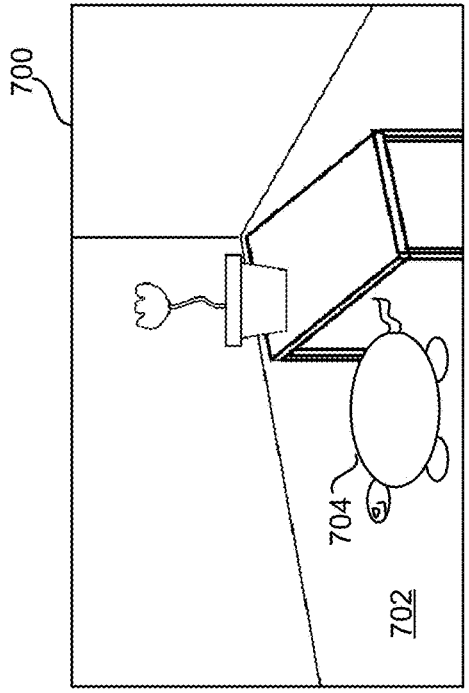
Figure 7C:
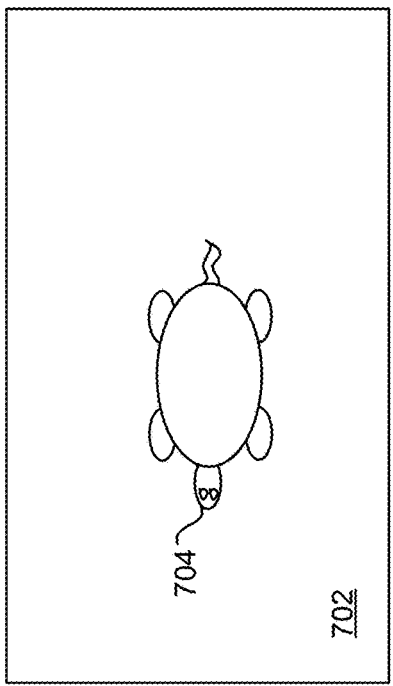
Figure 7D:
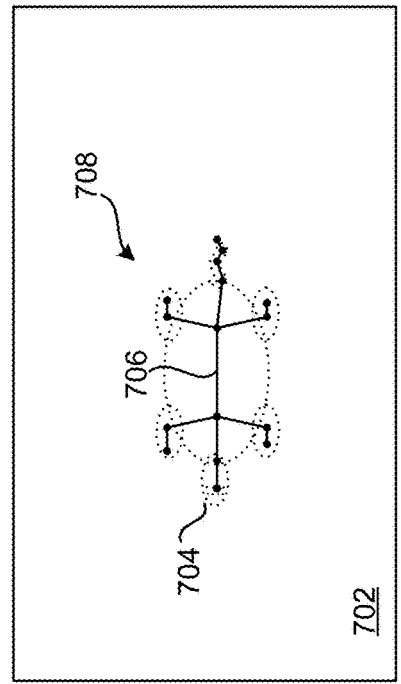

At operation 606, a location is determined for content that will be inserted. In some implementations, the content includes a polygonal mesh that is defined, at least in part, by a skeleton that has a plurality of joints. As described above, the location may be determined in various ways, such as based on user input, the location of the surface plane, and/or a location of the content in a previous image. FIG. 7B shows an example of the content 704 at an example determined location overlaid on the image 700. FIG. 7C shows the content 704 over the surface plane 702 from a top view and FIG. 7D shows the skeleton 706 that includes joints 708.

Figure 7F:
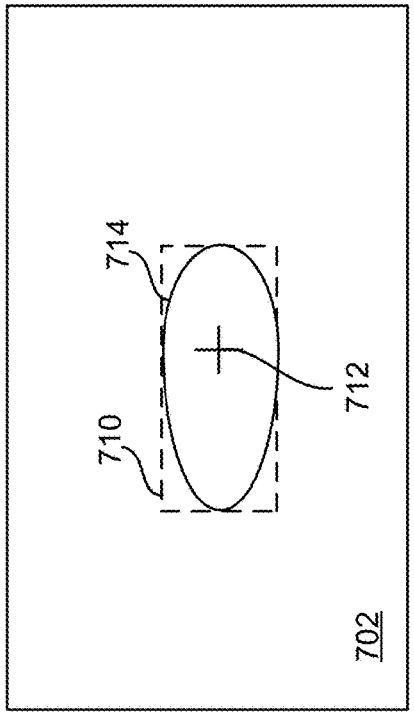
Figure 7H:
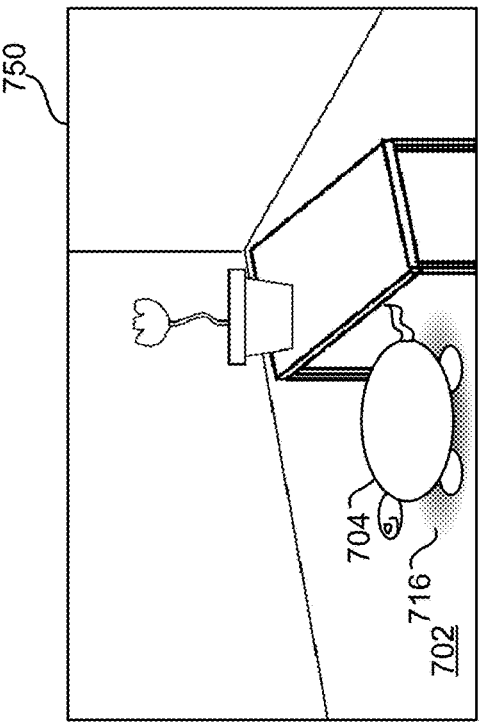
Figure 7E:
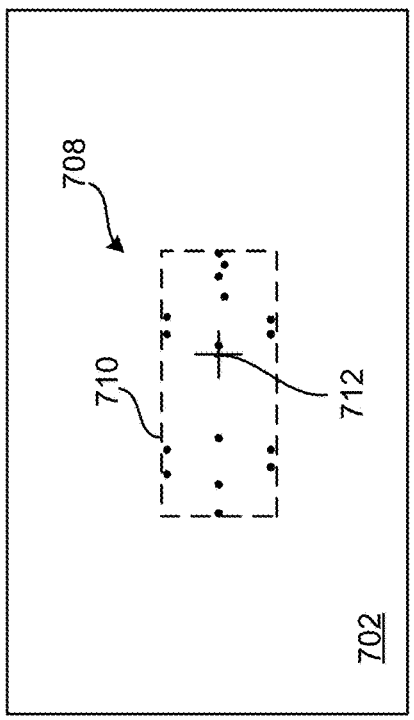

At operation 608, a bounding box is generated on the surface plane for the content based on the plurality of joints. As described above, the bounding box may be a rectangle on the surface plane (e.g., an X-Z plane) that bounds (contains) all or substantially all of the joints. FIG. 7E shows an example bounding box 710 on the surface plane 702 that bounds the joints 708. As noted above, a data structure associated with the inserted content may identify a subset of joints to include or exclude from use in generating the bounding box.

At operation 610, a center of mass location on the surface plane is determined based on the plurality of joints. As described above, the joints may be weighted equally and the center of mass is determined to be the average position of the joints. Alternatively, the joints may be weighted by various factors, such as distance above the surface plane. FIG. 7E shows an example shadow center point 712 on the surface plane 702 that is determined as the center of mass location of the joints 708. In some implementations, a data structure associated with the inserted content may provide weighting values for the joints or may identify a subset of joints to include or exclude from use in determining the center of mass.

At operation 612, an oval-shaped shadow polygon is generated on the surface plane based on the bounding box and the center of mass location. As described above, the oval may be sized to fit inside the bounding box and may have a first axis and second axis that intersect at the center of mass location. FIG. 7F shows an example oval-shaped (e.g., oblong-shaped) shadow polygon 714.

Figure 7G:
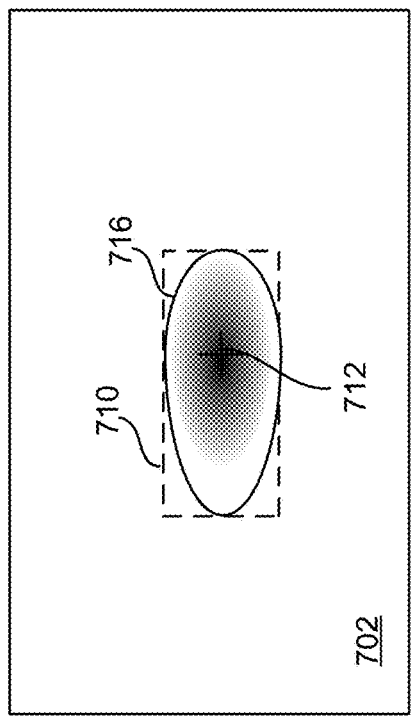

At operation 614, the shadow polygon is rendered using transparency values based on a radial falloff from the center of mass location. As described above, the radial falloff may be linear or non-linear. FIG. 7G shows an example rendered oval-shaped shadow polygon 716.

At operation 616, the content is inserted in front of the rendered shadow polygon. Both the shadow entity and the inserted content can be overlaid on the image captured at operation 602 to generate an augmented image. An example augmented image 750 is shown in FIG. 7H. The augmented image 750 includes the content 704 and the rendered oval-shaped shadow polygon 716 overlaid on the image 700.

Figure 8:
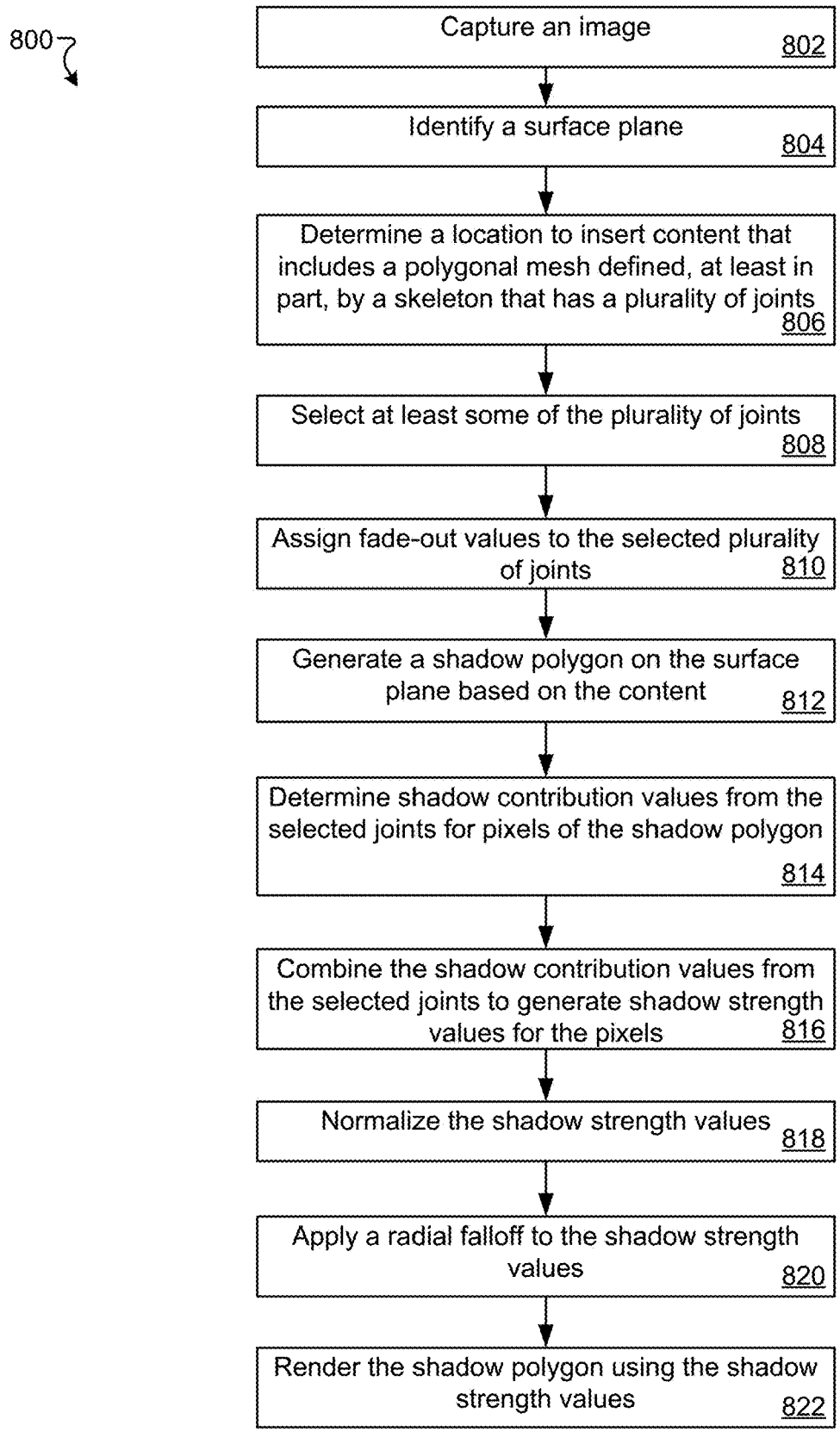
FIG. 8 is a diagram of an example method of generating shadows for inserted content, in accordance with implementations described herein.

FIG. 8 is a diagram of an example method 800 of generating shadows for inserted content, in accordance with implementations described herein. This method 800 may for example be performed by the computing device 102 to provide an AR environment for a user.

At operation 802, an image is captured. For example, the image may be captured by a camera assembly of a computing device, such as the computing device 102. The captured image may be stored as a texture in the image buffer 124. The example image 700 is shown in FIG. 7A and is used as the basis for the rest of the examples shown in FIGS. 9A-9I.

Figure 9B:
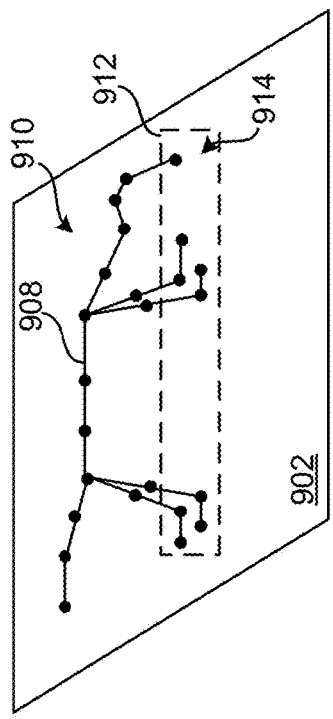
FIGS. 9A-9I are schematic diagrams of steps of generating shadows for inserted content in accordance with implementations as described herein.
Figure 9D:
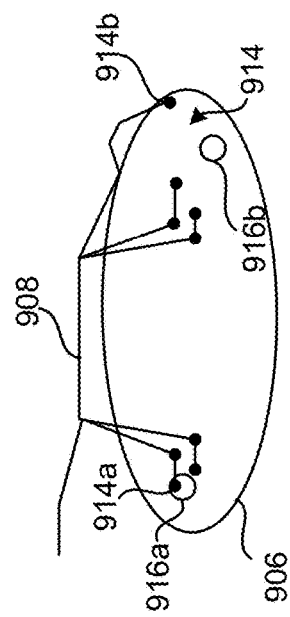
Figure 9A:
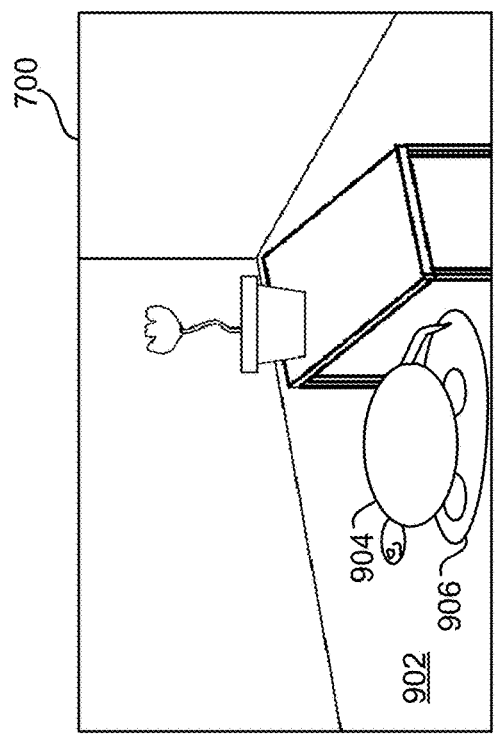

At operation 804, a surface plane is identified in the image. As described above, the surface plane may correspond to the ground or a floor in the image. An example surface plane 902 that has been identified in the image 700 is shown in FIG. 9A.

At operation 806, a location is determined for content that will be inserted. In some implementations, the content includes a polygonal mesh that is defined, at least in part, by a skeleton that has a plurality of joints. As described above, the location may be determined in various ways, such as based on user input, the location of the surface plane, and/or a location of the content in a previous image. FIG. 9A shows an example of the content 904 at an example determined location overlaid on the image 700 (the image 700 can be seen without the inserted content at FIG. 7A). Also shown in FIG. 9A is a shadow polygon 906, which is described further with respect to operation 812. FIG. 9B shows a skeleton 908 associated with the content 904. The skeleton 908 includes joints 910.

At operation 808, at least some joints of the plurality of joints are selected to generate a plurality of selected joints. FIG. 9B shows a region 912 identifying the plurality of selected joints 914. In this example, the joints are being selected based on distance to the surface plane 902. In some implementations, the joints are selected based on a data structure associated with the inserted content. For example, the data structure may identify some joints that should or should not be selected (e.g., to exclude these joints from contributing to shadows).

Figure 9C:
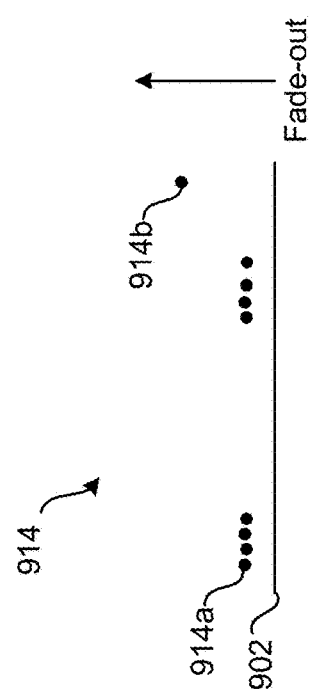

At operation 810, fade-out values are assigned to the selected plurality of joints. The fade-out values may be based on distance from the surface plane 902. FIG. 9C shows a side view of the selected plurality of joints 914 in relation to the surface plane 902. As shown, the fade-out value increases as distance from the surface plane 902 increases.

At operation 812, a shadow polygon is generated on the surface plane based on the content. The shadow polygon may be generated in many ways. For example, the shadow polygon may be rectangular and sized based on a bounding box of the full plurality of joints of the skeletal model. The shadow polygon may also have a more rounded shape formed from, for example, sixteen sides arranged to form a closed oval-like shape. An example shadow polygon 906 is shown in FIG. 9A below the content 904.

At operation 814, shadow contribution values from the selected joints for pixels of the shadow polygon are determined. In some implementations, shadow contribution values are calculated for each of the selected joints for each of the pixels. As described previously, the shadow contribution value for a specific selected joint with respect to a specific pixel can be based on a variety of factors, such as the fade-out value for the specific selected joint, a distance from the specific selected joint to a specific pixel, and an overhead angle of the specific selected joint with respect to the selected pixel. FIG. 9D shows example pixels 916a and 916b from the shadow polygon 906. Also shown in FIG. 9D are selected joints 914a and 914b from the plurality of selected joints 914.

Figure 9G:
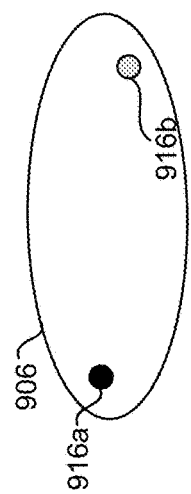
Figure 9I:
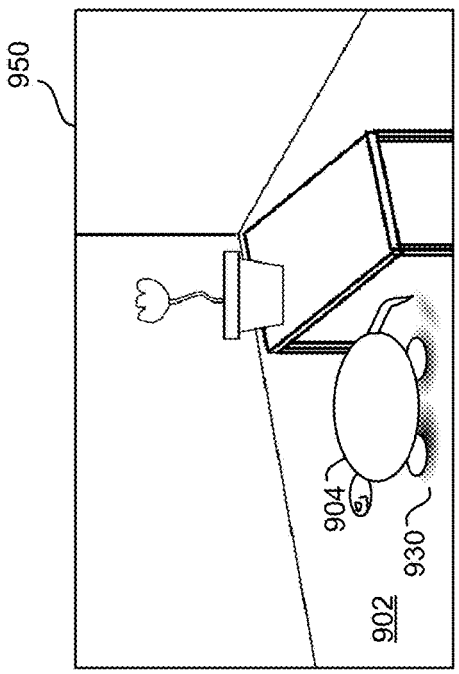
Figure 9E:
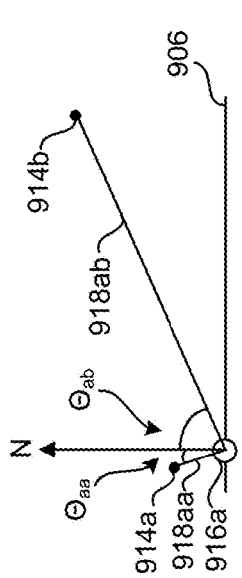

FIG. 9E shows a schematic example of the distance values and overhead angles for the pixel 916a with respect to the selected joints 914a and 914b. In this example, the length of the line 918aa corresponds to the distance from the pixel 916a to the selected joint 914a, and the length of the line 918ab corresponds to the distance from the pixel 916a to the selected joint 914b. Also shown in this example is, an overhead angle $\Theta_{aa}$ between the normal N of the shadow polygon 906 and the line 918aa (between the pixel 916a and the selected joint 914b), and an overhead angle $\Theta_{ab}$ between the normal N and the line 918ab (between the pixel 916a and the selected joint 914b).

Figure 9F:
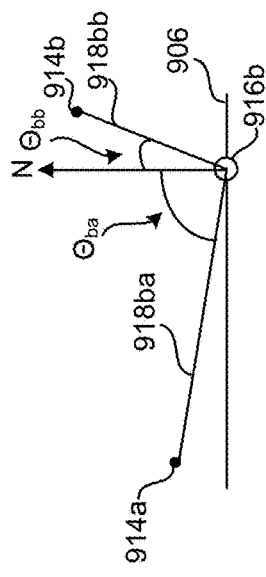

Similarly, FIG. 9F shows a schematic example of the distance values and overhead angles for the pixel 916b with respect to the selected joints 914a and 914b. In this example, the length of the line 918ba corresponds to the distance from the pixel 916b to the selected joint 914a, and the length of the line 918*bb* corresponds to the distance from the pixel 916*b* to the selected joint 914*b*. Also shown in this example is, an overhead angle $\Theta_{ba}$ between the normal N of the shadow polygon 906 and the line 918*ba* (between the pixel 916*b* and the selected joint 914*a*), and an overhead angle $\Theta_{bb}$ between the normal N and the line 918*bb* (between the pixel 916*b* and the selected joint 914*b*).

In some implementations, the shadow contribution value for a specific selected joint with respect to a specific selected pixel is based on a combination, such as a sum, of a value based on the distance (e.g., the inverse of the distance, a solid angle calculation, or an approximation of a solid angle calculation as described above) and a value based on the overhead angle (e.g., a cosine value of the overhead angle, which in some implementations is scaled by the fade-out value for the specific selected joint).

Although the examples of FIGS. 9D-9E relate to shadow contributions values between two pixels on the polygon 906 and two of the selected joints 914, this is just to clarify the drawings. As noted above, in at least some implementations, shadow contribution values are determined between each of the pixels of the polygon 906 and each of the selected joints. In some implementations, a shader in a rendering pipeline of a GPU may perform at least some of the calculations required to determine the shadow contribution values.

At operation 816, the shadow contribution values from the selected joints are combined to generate shadow strength values for the pixels. The shadow contributions values may be combined in various ways. For example, the shadow contributions values may be combined by selecting the maximum shadow contribution for a particular pixel from the shadow contribution values from each of the selected joints for that particular pixel. FIG. 9G shows an example of the polygon 906 with the pixels 916*a* and 916*b* shaded based on example shadow strength values.

At operation 818, the shadow strength values are normalized. For example the shadow strength values may be normalized to a desired shadow profile using a gamma function. The gamma function may map the shadow strength values determined at operation 816 to a distribution that emphasizes mid-tone shadows and reduces dark shadows.

Figure 9H:
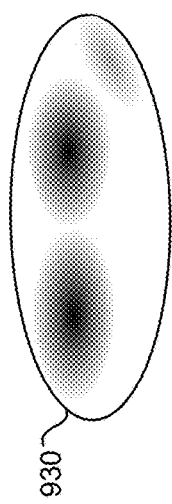

At operation 820, a radial falloff is applied to the normalized shadow strength values to generate adjusted shadow strength values. The radial falloff applied to the normalized shadow strength values may be linear or non-linear. The radial falloff may cause the shadow intensity to be reduced at the edges of the shadow polygon. FIG. 9H shows an example rendered shadow polygon 930 that is based on applying the adjusted shadow strength values to the shadow polygon 906.

At operation 822, the shadow polygon may be rendered using the shadow strength values. Then, both the shadow entity and the inserted content can be overlaid on the image captured at operation 802 to generate an augmented image. An example augmented image 950 is shown in FIG. 9I. The augmented image 950 includes the content 904 and the rendered shadow polygon 930 overlaid on the image 700. As shown in the example in FIG. 9I, the rendered shadow polygon 930 includes darker shadow regions based on proximity to the selected shadow joints.

As described previously, the method 800 for generating shadows can be combined with the method 500 or method 600 described in FIGS. 5 and 6, respectively. For example, the rendered shadow polygon 930 can be combined with the rendered oval-shaped shadow polygon 716 (from FIG. 7G) to generate a combined shadow polygon.

Figure 10:
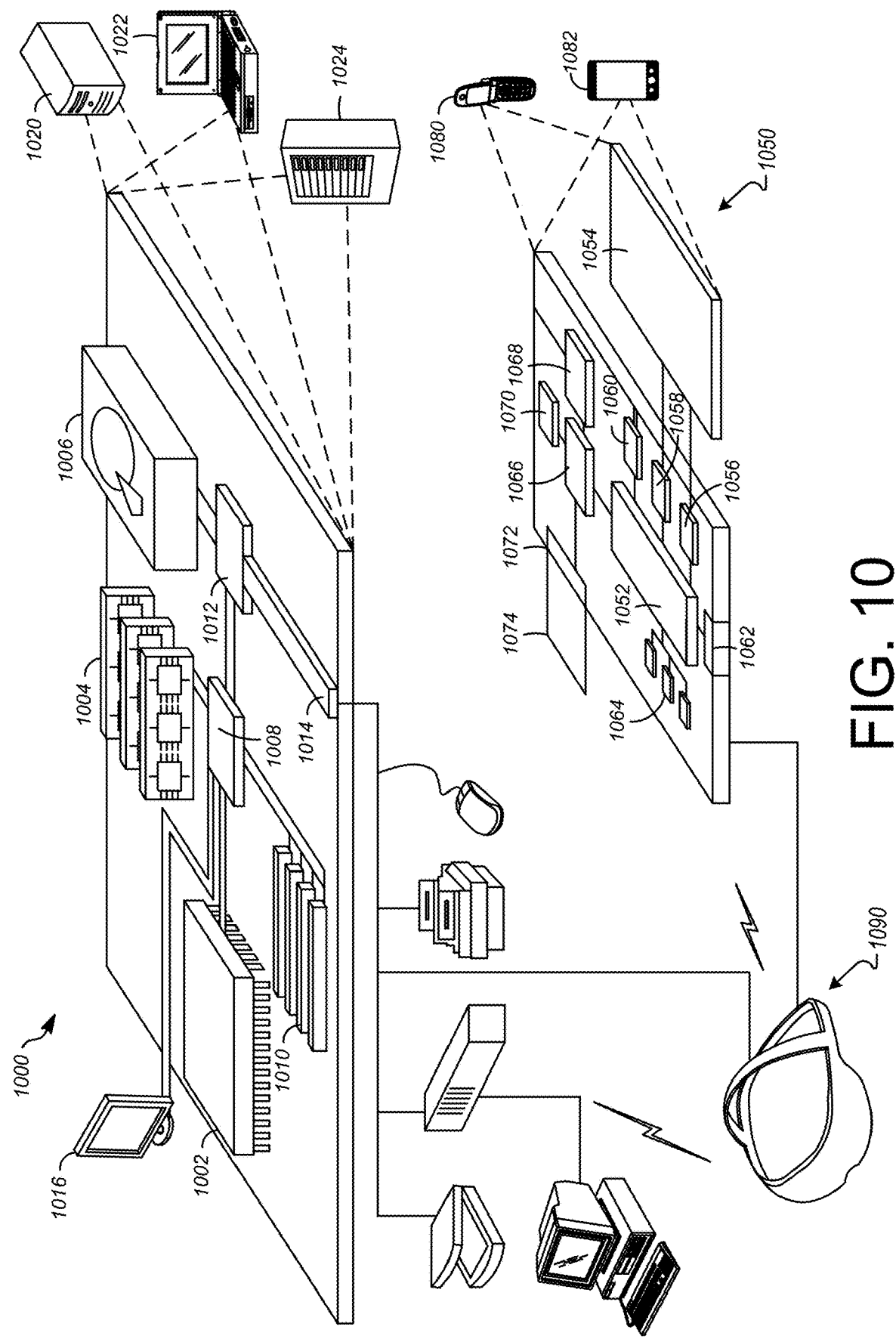
FIG. 10 shows an example of a computer device and a mobile computer device that can be used to implement the techniques described herein.

FIG. 10 shows an example of a computer device 1000 and a mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may include appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In-Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (an LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 10 can include sensors that interface with an AR headset/HMD device 1090 to generate an augmented environment for viewing inserted content within the physical space. For example, one or more sensors included on a computing device 1050 or other computing device depicted in FIG. 10, can provide input to the AR headset 1090 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the AR space that can then be used as input to the AR space. For example, the computing device 1050 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the AR space can cause a particular action to occur in the AR space.

In some implementations, a touchscreen of the computing device 1050 can be rendered as a touchpad in AR space. A user can interact with the touchscreen of the computing device 1050. The interactions are rendered, in AR headset 1090 for example, as movements on the rendered touchpad in the AR space. The rendered movements can control virtual objects in the AR space.

In some implementations, one or more output devices included on the computing device 1050 can provide output and/or feedback to a user of the AR headset 1090 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the AR space. In the example of the laser pointer in a AR space, the computing device 1050 appears as a virtual laser pointer in the computer-generated, 3D environment. As the user manipulates the computing device 1050, the user in the AR space sees movement of the laser pointer. The user receives feedback from interactions with the computing device 1050 in the AR environment on the computing device 1050 or on the AR headset 1090.

In some implementations, a computing device 1050 may include a touchscreen. For example, a user can interact with the touchscreen in a particular manner that can mimic what happens on the touchscreen with what happens in the AR space. For example, a user may use a pinching-type motion to zoom content displayed on the touchscreen. This pinching-type motion on the touchscreen can cause information provided in the AR space to be zoomed. In another example, the computing device may be rendered as a virtual book in a computer-generated, 3D environment. In the AR space, the pages of the book can be displayed in the AR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the AR space to control objects in the AR space.

Computing device 1000 is intended to represent various forms of digital computers and devices, including, but not limited to laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:
    determining a location to insert content within an image, the content including a polygonal mesh defined in part by a skeleton that has a plurality of joints;
    selecting a plurality of selected joints form the plurality of joints;
    generating a shadow polygon;
    determining shadow contributions values for the plurality of selected joints for pixels of the shadow polygon;
    combining the shadow contribution values from the selected joints to generate shadow magnitude values for the pixels;
    rendering the shadow polygon using the shadow magnitude values; and
    overlaying the inserted content on the rendered shadow polygon.

2. The method of claim 1, wherein the selecting the plurality of selected joints comprises selecting joints based on a data structure associated with the content.

3. The method of claim 1, wherein the selecting the plurality of selected joints includes selecting joints based on distance to a surface plane that is identified based on the image.

4. The method of claim 3, wherein the selecting the plurality of selected joints includes selecting a threshold percentage of the plurality of joints that are closest to the surface plane.

5. The method of claim 3, further comprising assigning fade-out values to the plurality of selected joints based on distance to the surface plane.

6. The method of claim 1, wherein the shadow contribution value for a specific joint from the plurality of selected joints for a specific pixel of the shadow polygon is based on a distance from the specific pixel to the specific joint.

7. The method of claim 6, wherein the shadow contribution value for the specific joint for the specific pixel is based on an overhead angle between the specific pixel and the specific selected joint.

8. The method of claim 1, wherein the combining the shadow contribution values includes selecting a maximum shadow contribution value.

9. The method of claim 1, further comprising combining the rendered shadow polygon with an additional shadow polygon.

10. A non-transitory computer-readable storage medium comprising instructions stored thereon that, when executed by at least one processor, are configured to cause a computing system to at least:
    capture an image with a camera assembly;
    identify a surface plane within the image;
    determine a location to insert content, the content including a polygonal mesh defined in part by a skeleton that has a plurality of joints;
    select a plurality of selected joints form the plurality of joints;
    assign fade-out values to the plurality of selected joints;
    generate a shadow polygon based on the content;
    determine shadow contributions values for the plurality of selected joints for pixels of the shadow polygon;
    combine the shadow contribution values from the selected joints to generate shadow magnitude values for the pixels;
    normalize the shadow magnitude values to generate normalized shadow magnitude values;
    apply a radial falloff to the normalized shadow magnitude values to generated adjusted shadow magnitude values;
    render the shadow polygon using the adjusted shadow magnitude values; and
    overlay the inserted content on the rendered shadow polygon.

11. The non-transitory computer-readable storage medium of claim 10, wherein the instructions that cause the system to select the plurality of selected joints include instructions that cause the system to select joints based on a data structure associated with the content.

12. The non-transitory computer-readable storage medium of claim 11, wherein the data structure includes a joint blacklist and the instructions that cause the system to select the plurality of selected joints include instructions that cause the system to select joints that are not in the joint blacklist.

13. The non-transitory computer-readable storage medium of claim 10, wherein the selecting the plurality of selected joints includes selecting joints based on distance to a surface plane that is identified based on the image.

* * * * *